(12) United States Patent
Sun et al.

(10) Patent No.: US 10,786,937 B2
(45) Date of Patent: Sep. 29, 2020

(54) PROCESSING TECHNOLOGY FOR MAKING SEEPAGE IRRIGATION PIPE WITH ALTERNATE EFFLUENT SECTION AND NON-EFFLUENT SECTION

(71) Applicant: Ningxia University, Yinchuan (CN)

(72) Inventors: Zhaojun Sun, Yinchuan (CN); Jun He, Yinchuan (CN); Lei Han, Yinchuan (CN); Zhen Wang, Yinchuan (CN); Dongdong Han, Yinchuan (CN); Qiushi Ren, Yinchuan (CN); Bingzhong Jiao, Yinchuan (CN); Yuanjiao Guo, Yinchuan (CN); Menggang Li, Yinchuan (CN); Xingqiang Li, Yinchuan (CN)

(73) Assignee: Ningxia University, Yinchuan (CN)

( * ) Notice: Subject to any disclaimer, the term of this patent is extended or adjusted under 35 U.S.C. 154(b) by 243 days.

(21) Appl. No.: 16/144,729

(22) Filed: Sep. 27, 2018

(65) Prior Publication Data
US 2020/0016814 A1  Jan. 16, 2020

(51) Int. Cl.
*B29C 48/00* (2019.01)
*B29C 48/09* (2019.01)
*B29C 48/285* (2019.01)
*B29K 105/00* (2006.01)
(Continued)

(52) U.S. Cl.
CPC .......... *B29C 48/09* (2019.02); *B29C 48/0022* (2019.02); *B29C 48/022* (2019.02); *B29C 48/288* (2019.02); *B29K 2019/00* (2013.01); *B29K 2105/251* (2013.01); *B29K 2823/065* (2013.01); *B29L 2023/22* (2013.01)

(58) Field of Classification Search
CPC ......... B29L 2031/70; B29L 2031/7004; B29L 2031/7006
See application file for complete search history.

(56) References Cited

U.S. PATENT DOCUMENTS

| 4,003,408 A | * | 1/1977 | Turner | ........................ | 138/118 |
| 4,615,642 A | * | 10/1986 | Mason | ................... | A01G 25/06 |
| | | | | | 405/45 |

(Continued)

*Primary Examiner* — Matthew J Daniels
*Assistant Examiner* — Mohammad M Ameen
(74) *Attorney, Agent, or Firm* — Zhihua Han

(57) ABSTRACT

The present invention relates to a processing technology for manufacturing seepage irrigation pipe with alternating effluent sections and non-effluent sections, and in particular, to the field of underground seepage irrigation in agriculture and forestry. The processing technology combines the production unit for water-effluent pipes with the production unit for non-effluent pipes, and produces the seepage irrigation pipeline by adjusting the raw material ratios, controlling the spindle speed, spindle acceleration time, and spindle deceleration time of the two pipeline production units, to generate a seepage irrigation pipe with alternating effluent sections and non-effluent sections. The lengths of the effluent sections and non-effluent sections can be adjusted, the pipe wall thickness can also be adjusted by adjusting the inner and outer diameter of the internal mold of the pipe forming unit, a seepage irrigation pipe with alternating effluent sections and non-effluent sections is environment-friendly, efficient, water-saving, and useful for underground irrigation.

3 Claims, 1 Drawing Sheet

(51) Int. Cl.
   *B29K 19/00*      (2006.01)
   *B29L 23/00*      (2006.01)

(56) References Cited

U.S. PATENT DOCUMENTS

| | | | | |
|---|---|---|---|---|
| 5,811,038 A | * | 9/1998 | Mitchell | B29C 48/92 |
| | | | | 264/40.7 |
| 2016/0073595 A1 | * | 3/2016 | Smith | B05B 9/0423 |
| | | | | 239/1 |

* cited by examiner

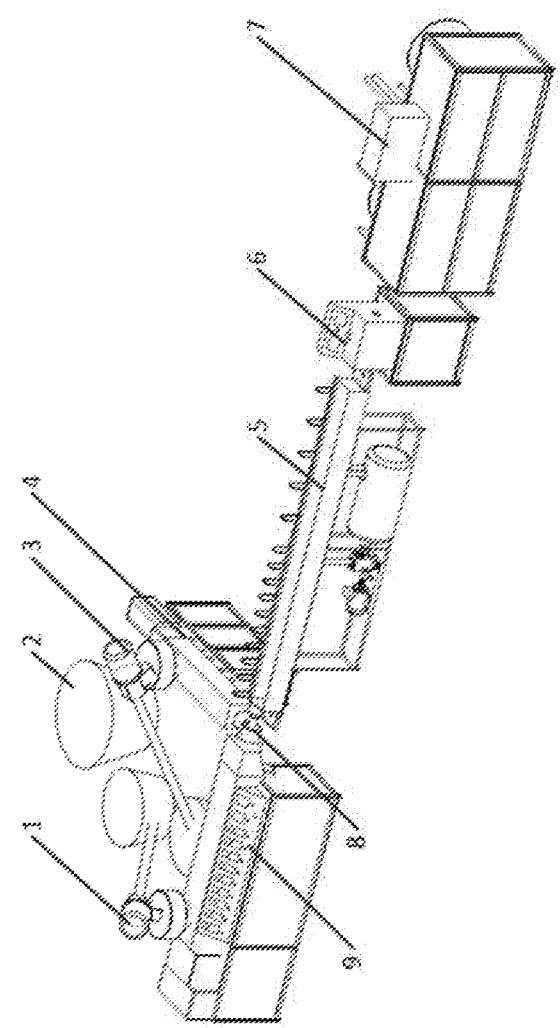

PROCESSING TECHNOLOGY FOR MAKING SEEPAGE IRRIGATION PIPE WITH ALTERNATE EFFLUENT SECTION AND NON-EFFLUENT SECTION

CROSS REFERENCE TO RELATED APPLICATION

This application claims the priority benefit of Chinese Patent Application No. CN201810753050.5, filed on Jul. 10, 2018, and Chinese Patent Application No. CN201821088522.1, filed on Jul. 10, 2018, which are hereby incorporated by reference in its entirety.

TECHNICAL FIELD

The present invention relates to a processing technology for manufacturing seepage irrigation pipe with alternating effluent sections and non-effluent sections, and in particular, to the field of underground seepage irrigation in agriculture and forestry.

BACKGROUND

Above-ground drip irrigation is a widely used water-saving irrigation technology. Compared with traditional irrigation methods, it can save significant amount of water resource. However, there exist problems for above-ground irrigation including water is easily evaporated and pipelines are vulnerable to ultraviolet rays and artificial damage. Replacement is frequently needed. Underground irrigation can directly transport water to the roots of plants, greatly reducing the evaporation of water. In addition, there is no ultraviolet light and artificial damage. The service life is prolonged and usually reaches many years for one installation. The comparative advantage is obvious.

At present, underground irrigation technology has problems such as easy blockage of pipes, uneven water discharge, and poor pressure resistance of pipe wall, and most of them are full-permeability pipes, that is, water can percolate along the entire length of the pipe. The same pipe does not have the function to discharge water in certain section, to block water in other section, or discharge water in alternate sections. Thus, present underground irrigation technology requires large numbers of fittings and blind pipes, which significant increases the labor and material cost, and seriously restricts the application of underground irrigation technology.

SUMMARY

The invention aims to overcome the inconvenience and high cost caused by the splicing and assembling of effluent pipe and non-effluent pipe, and provides a seepage irrigation pipe with alternating effluent sections and non-effluent sections, as well as method manufacturing method. The lengths of the effluent sections and non-effluent sections can be adjusted during production process and can be set to accommodate the seeding distance when planting crops.

In order to realize the above described goals, the present invention discloses a method and device for producing a seepage irrigation pipe with alternating, adjustable length effluent sections and non-effluent sections. The process include: 1) mixing and stirring raw materials and feeding to a production unit; 2) producing effluent section or 3) producing non-effluent section, in alternating matter; and 4) pipe cooling and packaging, wherein the step of 2) producing effluent section is alternated with the step of 3) producing the non-effluent section, wherein the step of 1) mixing and stirring raw materials and feeding to a production unit, the step of either 2) producing effluent section or 3) producing non-effluent section, and the step of 4) pipe cooling and packaging are carried out simultaneously.

The first step, i.e., mixing and stirring raw materials and feeding to production unit, is performed as follows: placing desulfurized tire rubber powder and high-density polyethylene pellet powder at a ratio of 1:0.6-1:0.3 in a blender (2), mixing for 15-30 minutes at 15-35° C.; feeding the mixture to a first extruder (9) through a first automatic feeder (1); placing desulfurized tire rubber powder and the high-density polyethylene pellet powder at a ratio of 1:1.2~1:0.7 in a blender (2), mixing for 15-30 minutes at 15-35° C., feeding the mixture into a second extruder (4) through a second automatic feeder (3).

The second step, i.e., producing effluent section, is performed as follows: setting the length of the effluent section through controlling the spindle speed of the first extruder (9) at 500~950 r/min and controlling temperatures in different areas within the first extruder (9) at 120~170° C., after reacting for 1~2 minutes, extruding the effluent section from the pipe forming unit (8);

The third step, i.e., producing non-effluent section, is performed as follows: setting the length of the non-effluent section through controlling the spindle speed of the second extruder (4) at 550~1000 r/min and controlling temperatures in different areas of the second extruder (4) at 120~170° C., after reacting for 1~2 minutes, extruding the non-effluent section from the pipe forming unit (8);

Transiting from producing the effluent section to producing the non-effluent section is realized through the following: by controlling the spindle acceleration time of the second extruder (4) at 0.5~2 seconds, the production of the effluent section was stopped automatically after 0.5~2 seconds of reaction, subsequently the non-effluent section is extruded from the pipe forming unit (8), wherein the spindle acceleration time is the time when the second extruder (4) accelerates from 0 to the set target speed;

Transiting from producing the non-effluent section to producing the effluent section is realized through the following: by controlling the spindle deceleration time of the second extruder (4) at 0.5~2 seconds, the production of the non-effluent section was stopped automatically after 0.5~2 seconds of reaction, subsequently the effluent section is extruded from the pipe forming unit (8), wherein the spindle deceleration time is the time when the second extruder (4) decelerates from present running speed to 0;

The step of pipe cooling and packaging is performed as follows: the sections extruded from pipe forming unit (8) is cooled by a pipeline cooling device (5), drawn to an automatic pipe coiler (7) through a pipe traction cutting machine (6), where the traction speed of the traction cutting machine (6) is set at 0.03~0.05 m/s, setting a total pipe length, after reaching the set length, automatically cutting the pipe by the pipe traction cutter (6), and wrapping and packaging the cut pipe by an automatic pipe coiling machine (7).

In the above process, the internal mold of the pipe forming unit (8) has an inner diameter of 15~18 mm and an outer diameter of 20~23 mm.

In the above process, the length of the effluent section, non-effluent section, and the total length of the pipe can be set freely.

In the above process, the particle size of the desulfurized tire rubber powder from are from 0.5~0.9 mm.

In the above process, the particle size of high-density polyethylene ranges from 1~3 mm.

In the above process, the pipe cooling device (5) is 4~6 meters long.

The inner diameter of the pipe produced using the above process is 15~18 mm and the outer diameter is 20~23 mm. The wall thickness is 2~3 mm. The pipe can be used for underground irrigation by burying underneath the ground at a depth of 10~50 cm. The effluent section and non-effluent section occur alternately; the shortest length of the effluent section is 30 cm, and the shortest length of the non-effluent section is 50 cm, there is no upper limit for the length beyond what is imposed by practicality. The service life is 5~10 years. Cost saving is over 40%. The economic benefits are significant.

The invention achieved a technological breakthrough that places effluent sections and non-effluent sections on the same pipe, greatly reduces the inconvenience and high cost caused by splicing and assembling effluent and non-effluent pipes. In particular, mechanized production of the seepage irrigation pipeline with alternate effluent and non-effluent section is not only environmentally friendly, efficient, and water-saving, but also an integrated process that increases the operation efficiency, is amenable to intelligent production of special pipeline, meets the needs of water-saving interval irrigation in the field of agricultural and forestry with effluent and non-effluent pipe. The invention brings huge convenience and considerable gain to the practitioners and operators of water-saving irrigation.

The seepage irrigation pipe with alternate effluent and non-effluent sections can be buried underground 10 cm below or deeper. It transmits water directly to plant roots, which greatly reduces evaporation. There is no sun, ultra-violet exposure, or artificial damage. In addition, the pipe doesn't need to be re-installed often. Once laid, the pipeline can be used for many years.

BRIEF DESCRIPTION OF THE DRAWINGS

FIG. 1 is a diagram showing a pipe production device configured to manufacture a seepage irrigation pipe with alternating effluent sections and non-effluent sections.

DETAILED DESCRIPTION OF THE PREFERRED EMBODIMENTS

Embodiment 1

Adjust the inner diameter and outer diameter of internal mold of the pipe forming unit (8) to 16.6 mm and 21.2 mm, respectively. Add 100 parts of 20 mesh desulfurized tire rubber powder (natural gum:synthetic gum:carbon black:aromatic oil:zinc oxide:stearic acid:accelerant=55:40:50:7:3:1:1:0.5) and 45 parts of 10 mesh high density polyethylene powder into a blender (2) to stir for 30 minutes at 25° C.; load the mixture to the first extruder (9) through the first automatic feeder (1); add 100 parts of 20 mesh desulfurized tire rubber powder (natural gum:synthetic gum:carbon black:aromatic oil:zinc oxide:stearic acid:accelerant=55:40:50:7:3:1:1:0.5) and 100 parts of 10 mesh high density polyethylene powder into the blender (2) to stir for 30 minutes in at 25° C., load the mixture to the second extruder (4) through the second automatic feeder (3).

Set the spindle speed of the first extruder (9) at 650 r/min. There are three heat-melting areas and one raw material extrusion area in the first extruder (9). Set the temperatures of three heat-melting areas and one raw material extrusion area at 156° C., 163° C., 157° C. and 143° C., respectively. After reacting for 1~2 minutes, the effluent pipe is extruded from the pipe forming unit (8).

Set the length of effluent section at 50 cm. When transiting from producing effluent section to producing non-effluent section, set the spindle speed of the second extruder at 720 r/min. The second extruder has four heat-melting areas and one raw material extrusion area, the temperatures of which are set at 145° C., 149° C., 149° C., 143° C., and 150° C., respectively. The spindle acceleration time of the second extruder is 0.9 s, the effluent section stops production automatically after 0.9 s, the non-effluent section starts to be extruded from the pipe forming unit (8).

Set the length of the non-effluent section at 50 cm, when transiting from producing non-effluent section to producing effluent section, set the spindle deceleration time of the second extruder at 1.0 s, the non-effluent section stops production automatically after 1.0 s, the effluent pipe starts to be extruded from the pipe forming unit (8). The effluent and non-effluent sections are automatically produced alternately.

The pipe extruded from pipe forming unit (8) is drawn to an automatic pipe coiler through a pipe traction cutting machine after cooling by pipeline cooling device. Control the traction speed of traction cutting machine to 0.04 m/s, set the total pipe length at 150 m, after reaching 150 m, the pipe traction cutter automatically cuts the pipe, and the automatic pipe coiling machine tightens the pipe to pack.

The performance parameters of the seepage irrigation pipe with alternating effluent sections and non-effluent sections are: the inner and outer diameter of the pipe is 16 mm and 21 mm, respectively; the wall thickness of the pipe is 2.5 mm. The pipe can be buried at 10~30 cm below the ground for underground irrigation, with effluent section and non-effluent section appears alternately in the same pipe. The lengths of the effluent and non-effluent section are all 50 cm, the service life is more than 5 years, saving 45% of the cost.

Embodiment 2

Adjust the inner diameter and outer diameter of internal mold of the pipe forming unit (8) to 16.6 mm and 22.5 mm, respectively. Add 100 parts of 20 mesh desulfurized tire rubber powder (natural gum:synthetic gum:carbon black:aromatic oil:zinc oxide:stearic acid:accelerant=55:40:50:7:3:1:1:0.5) and 40 parts of 10 mesh high density polyethylene powder into a blender to stir for 25 minutes at 25° C.; load the mixture to the first extruder through the first automatic feeder (1); add 100 parts of 20 mesh desulfurized tire rubber powder (natural gum:synthetic gum:carbon black:aromatic oil:zinc oxide:stearic acid:accelerant=55:40:50:7:3:1:1:0.5) and 90 parts of 10 mesh high density polyethylene powder into the blender to stir for 25 minutes in at 25° C., load the mixture to the second extruder through the second automatic feeder.

Set the spindle speed of the first extruder (9) at 900 r/min. There are three heat-melting areas and one raw material extrusion area in the first extruder (9). Set the temperatures of three heat-melting areas and one raw material extrusion area at 127° C., 126° C., 137° C. and 138° C., respectively. After reacting for 1~2 minutes, the effluent pipe is extruded from the pipe forming unit.

Set the length of effluent section at 40 cm. When transiting from producing effluent section to producing non-effluent section, set the spindle speed of the second extruder at 960 r/min. The second extruder has four heat-melting areas and one raw material extrusion area, the temperatures of which are set at 128° C., 132° C., 138° C., 140° C., and 133° C., respectively. The spindle acceleration time of the second extruder is 0.8 s, the effluent section stops production automatically after 0.8 s, the non-effluent section starts to be extruded from the pipe forming unit.

Set the length of the non-effluent section at 90 cm, when transiting from producing non-effluent section to producing effluent section, set the spindle deceleration time of the second extruder at 0.7 s, the non-effluent section stops production automatically after 0.7 s, the effluent pipe starts to be extruded from the pipe forming unit. The effluent and non-effluent sections are automatically produced alternately.

The pipe extruded from pipe forming unit is drawn to an automatic pipe coiler through a pipe traction cutting machine after cooling by pipeline cooling device. Control the traction speed of traction cutting machine to 0.044 m/s, set the total pipe length at 200 m, after reaching 200 m, the pipe traction cutter automatically cuts the pipe, and the automatic pipe coiling machine tightens the pipe to pack.

The performance parameters of the seepage irrigation pipe with alternating effluent sections and non-effluent sections are: the inner and outer diameter of the pipe is 16 mm and 22 mm, respectively; the wall thickness of the pipe is 3.0 mm. The pipe can be buried at 10~50 cm below the ground for underground irrigation, with effluent section and non-effluent section appears alternately in the same pipe. The length of the effluent is 40 cm, the length of the non-effluent section is 90 cm. The service life is more than 6 years. Cost-saving is above 55%.

Embodiment 3

Adjust the inner diameter and outer diameter of internal mold of the pipe forming unit (8) to 16.6 mm and 22.5 mm, respectively. Add 100 parts of 20 mesh desulfurized tire rubber powder (natural gum:synthetic gum:carbon black:aromatic oil:zinc oxide:stearic acid:accelerant=55:40:50:7:3:1:1:0.5) and 40 parts of 10 mesh high density polyethylene powder into a blender to stir for 25 minutes at 25° C.; load the mixture to the first extruder through the first automatic feeder.

The pipe extruded from pipe forming unit is drawn to an automatic pipe coiler through a pipe traction cutting machine after cooling by pipeline cooling device. Control the traction speed of traction cutting machine to 0.041 m/s, set the total pipe length at 120 m, after reaching 120 m, the pipe traction cutter automatically cuts the pipe, and the automatic pipe coiling machine wraps and packs the cut pipe.

The performance parameters of the full-permeability pipe produced by this Embodiment are as follows: the inner and outer diameter of the pipe is 16 mm and 22 mm, respectively; the wall thickness of the pipe is 3.0 mm. The pipe can be buried at 10~35 cm below the ground for underground irrigation. The entire length of the pipe is permeable. The service life is more than 6 years. Cost-saving is above 60%.

What is claimed is:

1. A process for manufacturing a seepage irrigation pipe with alternative effluent sections and non-effluent sections, comprising steps of mixing and stirring raw materials and feeding to a production unit; producing effluent section; producing non-effluent section; and pipe cooling and packaging, wherein the step of producing effluent section is alternated with the step of producing the non-effluent section, wherein the step of mixing and stirring raw materials and feeding to a production unit, the step of either producing effluent section or producing non-effluent section, and the step of pipe cooling and packaging are carried out simultaneously;

wherein the step of the mixing and stirring raw materials and feeding to a production unit further comprises: placing desulfurized tire rubber powder and high-density polyethylene pellet powder at a ratio of 1:0.6-1:0.3 in a blender (2), mixing for 15-30 minutes at 15-35° C.; feeding the mixture to a first extruder (9) through a first automatic feeder (1); placing desulfurized tire rubber powder and high-density polyethylene pellet powder at a ratio of 1:1.2~1:0.7 in a blender (2), mixing for 15-30 minutes at 15-35° C. to form a second mixture, feeding the second mixture into a second extruder (4) through a second automatic feeder (3);

wherein the step of producing effluent section further comprises: setting a length of the effluent section by controlling a spindle speed of the first extruder (9) at 500~950 r/min and controlling temperatures in different areas of the first extruder (9) at 120~170° C., after reacting for 1~2 minutes, extruding the effluent section from a pipe forming unit (8);

wherein the step of producing non-effluent section further comprises: setting a length of the non-effluent section by controlling a spindle speed of the second extruder (4) at 550~1000 r/min and controlling temperatures in different areas of the second extruder (4) at 120~170° C., after reacting for 1~2 minutes, extruding the non-effluent section from the pipe forming unit (8);

wherein when transiting from producing the effluent section to producing the non-effluent section, by controlling a spindle acceleration time of the second extruder (4) at 0.5~2 seconds, the production of the effluent section was stopped automatically after 0.5~2 seconds of reaction, subsequently the non-effluent section is extruded from the pipe forming unit (8), wherein the spindle acceleration time is the time when the second extruder (4) accelerates from 0 to the set target speed;

wherein when transiting from producing the non-effluent section to producing the effluent section, by controlling a spindle deceleration time of the second extruder (4) at 0.5~2 seconds, the production of the non-effluent section was stopped automatically after 0.5~2 seconds of reaction, subsequently the effluent section is extruded from the pipe forming unit (8), wherein the spindle deceleration time is the time when the second extruder (4) decelerates from present running speed to 0; and wherein the step of pipe cooling and packaging further comprises: the sections extruded from pipe forming unit (8) is cooled by a pipeline cooling device (5), drawn to an automatic pipe coiler (7) through a pipe traction cutting machine (6), where a traction speed of the traction cutting machine (6) is set at 0.03~0.05 m/s, setting a total pipe length; after reaching the set length, automatically cutting the pipe by the pipe traction cutter (6), and wrapping and packaging the cut pipe by an automatic pipe coiling machine (7).

2. The process according to claim 1, wherein an internal mold of the pipe forming unit (8) has an inner diameter of 15~18 mm and an outer diameter of 20~23 mm.

3. The process according to claim 1, wherein particle size of the desulfurized tire rubber powder ranges from 0.5~0.9 mm, and the particle size of high-density polyethylene ranges from 1~3 mm.

* * * * *